United States Patent [19]

Dilgren et al.

[11] 4,161,217
[45] Jul. 17, 1979

[54] HOT WATER FOAM OIL PRODUCTION PROCESS

[75] Inventors: Richard E. Dilgren, Houston; Kenneth B. Owens, Spring, both of Tex.

[73] Assignee: Shell Oil Company, Houston, Tex.

[21] Appl. No.: 903,469

[22] Filed: May 8, 1978

[51] Int. Cl.² ............................................. E21B 43/24
[52] U.S. Cl. ................................. 166/252; 166/272; 166/273; 166/274
[58] Field of Search ............... 166/252, 269, 271, 273, 166/274, 303

[56] References Cited
U.S. PATENT DOCUMENTS

| | | | |
|---|---|---|---|
| 3,100,528 | 8/1963 | Plummer et al. ..................... | 166/303 |
| 3,318,379 | 5/1967 | Bond et al. ........................... | 166/273 |
| 3,342,261 | 9/1967 | Bond ................................ | 166/305 R X |
| 3,366,175 | 1/1968 | Ferrell et al. ..................... | 166/269 X |
| 3,412,793 | 11/1968 | Needham ........................ | 166/272 X |
| 3,464,491 | 9/1969 | Froning ........................... | 166/272 X |
| 3,491,832 | 1/1970 | Raza ................................. | 166/269 |
| 3,529,668 | 9/1970 | Bernard ........................... | 166/273 |
| 4,068,717 | 1/1978 | Needham ........................ | 166/272 |
| 4,085,800 | 4/1978 | Engle et al. ..................... | 166/272 X |
| 4,086,964 | 5/1978 | Dilgren et al. ................... | 166/272 |

*Primary Examiner*—Stephen J. Novosad
*Assistant Examiner*—George A. Suchfield

[57] ABSTRACT

A relatively viscous oil is produced from a subterranean reservoir by establishing a channel of preferential permeability through the reservoir between injection and production locations, then flowing through the reservoir a hot foam of aqueous liquid, noncondensable gas and surfactant, and controlling the mobility of the foam so that heated oil is produced and hot fluid is flowed through portions of the reservoir within and outside the channel of preferential permeability.

16 Claims, 7 Drawing Figures

FIG. 4 (EARLY STAGE)

FIG. 4A (LATER STAGE)

FIG. 5 (EARLY STAGE)

FIG. 5A (LATER STAGE)

HOT WATER FOAM OIL PRODUCTION PROCESS

BACKGROUND OF THE INVENTION

The invention relates to a thermal drive process for producing oil from a subterranean reservoir. More particularly, it relates to producing oil from a reservoir interval which contains an oil having a relatively high viscosity, at the reservoir temperature, within a rock layer of relatively high absolute permeability.

The present invention is similar to but distinct from that of patent application Ser. No. 801,271, filed May 27, 1977, now U.S. Pat. No. 4,086,964 by R. E. Dilgren, G. J. Hirasaki, H. J. Hill and D. J. Whitten. The pertinent disclosures and prior art discussion of that application (the '271 application) are incorporated herein by cross-reference. The '271 application relates to a steam-foam-aided steam drive process for producing oil. It is applicable to a reservoir which is sufficiently free of stratifications in the absolute permeability of the rocks so that when steam flows through the reservoir it follows a path having a location determined by the effects of gravity and/or the distribution of the oil, rather than a path confined within one or more layers of particularly permeable rocks. In the process of the '271 application, steam is injected so that a steam channel is formed between horizontally separated injection and production locations. Then, a steam foam consisting essentially of steam, noncondensable gas, aqueous liquid and surfactant is flowed through the steam channel. And, the mobility of the steam foam is controlled so that, without plugging the steam channel, the flowing of the foam through the channel causes the rates of oil production and channel expansion to exceed those provided by flowing steam through the channel.

The present invention differs from the '271 application process in utilizing a mobility-controlling hot water foam consisting essentially of a noncondensable gas dispersed within a hot aqueous liquid. In the present foam, the gaseous phase consists essentially of noncondensable gas; as distinguished from the foam used in the process of the '271 application, in which a predominate proportion of the gaseous phase of the foam is steam. As known to those skilled in the art, at a given pressure, the temperature of a foam of noncondensable gas-in-gaseous liquid is less than that of a steam foam, by an amount at least equivalent to the heat of vaporizing the water that became the steam phase. On the other hand, since a foam consisting essentially of noncondensable gas and hot aqueous liquid is substantially free of steam, it can be used at a high pressure—whereas the use of a steam foam is limited to a pressure in the order of 1800 psi and thus to a reservoir at a depth of less than about 4000 feet.

The process of the present invention is also similar to but distinct from the process of patent application Ser. No. 884,308 filed Mar. 7, 1978 by R. E. Dilgren. The '308 application relates to a steam-foam aided, steam-drive oil recovery process that is similar to the process of the '271 application, except for using an unobviously beneficial foaming agent consisting essentially of a mixture of alkyl benzene sulfonates in which the alkyl groups have straight chains averaging near but less than 12 carbon atoms per group which mixture has a steam-foam forming efficiency at least substantially equaling that of a Conoco C-550 slurry of sulfonates (available from Continental Oil Company).

Various ways have been proposed for utilizing aqueous liquids and noncondensable gases, as mixtures or foams that are used, alone or in conjunction with steam, in fluid drive oil recovery processes. For example, U.S. Pat. No. 3,042,114 suggests injecting steam or hot water to form a hot zone and then injecting relatively cool gas, by itself or mixed with water, to advance the hot zone and improve the utilization of the heat stored in the reservoir rocks. U.S. Pat. No. 3,318,379 indicates that it was the plugging effects of foams which kept them from being successful as oil-displacing fluids and suggests injecting a surfactant, displacing it with surfactant-free liquid, and then injecting a foam-forming gas and a drive fluid to avoid plugging near the injector. U.S. Pat. No. 3,342,261 on fracturing a tar sand or oil shale, depleting the fracture walls, plugging the fracture with foam and repeating the procedure, recommends forming the foam in situ because of the difficulty of pumping and injecting a pre-formed foam. U.S. Pat. No. 3,360,045 suggests locating or forming a preferentially permeable streak or zone within a viscous oil reservoir and then injecting a hot noncondensable gas, then steam, then water, with the noncondensable gas being utilized to avoid the plugging that would occur if the steam or hot water were to be continuously injected. U.S. Pat. No. 3,464,491 relates to avoiding an oil-bypassing flow through a thief zone, by injecting a surfactant and then gas to form a flow-directing foam, and teaches that such a surfactant must be one which forms a foam that is unstable in the presence of oil. U.S. Pat. No. 3,477,510 suggests improving a steam and cool water or gas injecting process, such as that of the U.S. Pat. No. 3,042,114, by injecting alternating slugs of gas and water in order to reduce the tendency for the gas to overrun and the water to underrun the fluids in the reservoir. U.S. Pat. No. 3,529,668 on displacing oil with a foam bank, which is formed by injecting a surfactant followed by a gas, teaches that its displacement requires an injection of, specifically, from about 5 to 15 volumes of gas per volume of aqueous liquid. U.S. Pat. No. 3,572,473 suggests injecting steam to form a steam zone, short of causing a breakthrough into a production location, injecting water that is substantially as hot as the steam zone, to fill that zone, and then injecting unheated water to displace oil toward the production location. U.S. Pat. No. 3,908,762 suggests forming a preferentially permeable channel between injection and production locations within a tar sand, flowing through that channel steam mixed with enough gas to avoid the plugging effects of steam alone and then injecting steam or a mixture of steam and aqueous alkali to produce oil while expanding the channel. U.S. Pat. No. 4,068,717 suggests treating a tar sand by forming a fracture and holding the fracture open with an overburden supporting fluid pressure by first injecting steam at a fracture-forming-pressure and then injecting surfactant and more steam to form a relatively viscous steam foam that prevents a high rate of flow while steam is being flowed through the fracture at an overburdensupporting pressure. Canadian Pat. No. 1,004,977 suggests treating a viscous oil reservoir which has a permeability stratification that causes an injected fluid to channel through a preferentially permeable layer, by injecting hot water or steam until it breaks through into a production location, injecting enough foam or other partial plugging agent to occupy most of the flow paths within the preferentially permeable channel, and then injecting unheated water so that it partially bypasses the plugged zone, and increases the rate of oil production by displacing more of the oil which was heated by the prior injection of hot fluid.

SUMMARY OF THE INVENTION

The present invention relates to recovering oil from a subterranean reservoir interval which contains at least one potentially permeable oil-bearing layer; such as one in which, at the reservoir temperature, the absolute permeability is at least about 0.5 darcy and the oil viscosity is at least about 100 centipoises. Well conduits are arranged for injecting and producing fluid at horizontally separated locations within the reservoir interval. A hot and relatively non-viscous fluid is flowed through the reservoir interval while controling its temperature and flow rate so that (a) at least some of the inflowing fluid is hot enough to significantly increase the mobility of the reservoir oil, (b) a heated channel of preferential permeability is formed so that it extends between an injection and production location along a path located within or near at least one oil-bearing layer, and (c) the pressure gradient required for flowing the heated relatively non-viscous fluid through the heated channel becomes reduced or is kept relatively low by the thermal mobilization and removal of any viscous oil that tends to impede the flow through the heated channel. The composition of the fluid being flowed through the so-permeated reservoir interval is then changed by including, as some or all of that fluid, a relatively viscous hot water foam which consists essentially of noncondensable gas, aqueous liquid and surfactant and is hot enough to significantly increase the mobility of the reservoir oil. The composition of the relatively viscous hot water foam is correlated with the physical and chemical properties of the reservoir rocks and reservoir fluids so that, in contact with them, the foam is relatively stable and has a mobility which is low enough so that (a) flowing the foam through the heated channel of preferential permeability requires a pressure gradient exceeding that required for causing an equal rate of flow of the heated non-viscous fluid through that channel, but (b) is high enough so that a selected rate of flow is provided by an injection pressure which is less than the fracturing pressure or overburden-supporting pressure of the reservoir. Oil is recovered from fluid produced from the reservoir interval. And, the composition and temperature of the total amount of the hot fluid that is flowed through the reservoir is adjusted so that (a) the produced fluid contains heated oil and (b) a significant portion of the hot fluid is flowed through portions of the reservoir interval outside the channel of preferential permeability.

DESCRIPTION OF THE INVENTION

Prior teachings and beliefs concerning the mechanics of flowing a gas-in-liquid foam through a permeable earth formation indicate that plugging is apt to occur and, if the foam is pre-formed, the pressure required to inject it into the formation may be high enough to fracture the formation unless the formation has an exceptionally high permeability. In addition, within a permeable earth formation such a foam exhibits a relatively low mobility and a significant pressure gradient is required to force a bank of the foam through the formation. Thus, when such a foam is being flowed within an earth formation that is substantially free of oil, the injection pressure increases as more foam is injected, since the size of the foam bank is increasing and the inflowing of each new portion requires a displacement of a foam bank that is larger and less mobil. Adding to that fact is the fact that, since the pressure is lower on the portions of the foam which are located farther from the point of injection, the volume of the gas in those portions expands (i.e., the foam quality increases) and their flow resistance is increased (i.e., their mobility is reduced). Possibly for reasons such as the above, it appears that the previous uses of gas-in-liquid foam in oil production processes (whether the foams were hot or cold or were stable or unstable in contact with the oil) were mainly to serve as plugging or diverting agents for keeping subsequently injected fluids from entering zones of exceptionally high permeability.

However, applicant has now discovered that, with respect to producing a relatively viscous oil from a reservoir of a certain type, the composition and properties of a relatively viscous hot water foam can be arranged and controlled so that such plugging tendencies are avoided. This can be done where the reservoir interval being treated (a) contains an oil-bearing layer in which the oil is relatively viscous at the reservoir temperature and the absolute permeability is high, and (b) such an oil-bearing layer surrounds or extends along a region through which a preferentially permeable channel can be found or formed between injection and production locations. It is important that the foam used for so treating such a reservoir be stable in contact with the reservoir oil at a temperature at which the mobility of that oil is significantly increased. After finding or forming a preferentially permeable channel which is heated by flowing a hot relatively nonviscous fluid through the reservoir interval, the viscous hot water foam is flowed through that interval. The quality and composition of the foam are adjusted so that flowing it at a suitable rate requires a pressure gradient which is significantly greater than that required for a similar flow of the hot relatively nonviscous fluid, but is less than the fracturing or overburden-supporting pressure of the reservoir interval. When such a relatively viscous hot water foam is so flowed through the reservoir interval, the increased pressure gradient forces more hot fluid into contact with the oil in the potentially permeable oil-bearing layer and the resulting mobilization and displacement of that oil increases the effective permeability of that oil-bearing layer at a rate sufficient to counterbalance the tendency for the pressure required to flow the foam through the relatively oil-free portions of the preferentially permeable channel to increase with increases in the amount of injected foam.

As used herein the term "absolute" permeability refers to the permeability to steam or hot water of a mass of earth formation materials such as those comprising a subterranean reservoir formation or a core or sand pack that simulates such a formation, when those materials are substantially free of oil. The term "effective" permeability is used to refer to the capability of such a mass of earth formation materials for transmitting a particular fluid at a particular set of conditions, such as the presence of a reservoir oil at the reservoir temperature. In general, if a subterranean oil reservoir contains a significant amount of a viscois oil (e.g., an oil saturation of at least about 20%) and has an effective permeability to steam, which is significant (e.g., at least about 50 millidarcies), the absolute permeability of the reservoir is significant (e.g., at least about 500 millidarcies).

In general, when an interval of a subterranean reservoir contains a potentially permeable viscous oil layer, a preferentially permeable channel can be found or formed within the reservoir interval so that the channel can provide a flow path that extends between horizontally-spaced injection and production locations. If no naturally occuring preferentially permeable channel can be bound, for example by seismic and/or logging techniques, such a channel can be formed by means of currently available systems and procedures such as hydraulic fracturing and fracture propping, and the like.

In accordance with the present process such a preferentially permeable channel is formed within such a subterranean reservoir interval so that the channel extends through or near a preferentially permeable viscous oil layer, and preferably is located within or in fluid contact with the oil layer. For example, where a potentially permeable viscous oil layer occupies substantially all of the reservoir interval, the permeable channel can be formed by injecting a relatively non-viscous fluid (which is capable of mobilizing the reservoir oil by heating it and/or diluting it with a solvent) while producing fluid from the interval at a rate such that the injected fluid breaks through into the production location and soon removes enough oil from the most permeable portions of its flow path to form a channel which is substantially oil free and is significantly more permeable than the other portions of the reservoir interval. In the present process, if the first injected portions of such a non-viscous fluid were unheated, heated portions of the same or different non-viscous fluid are flowed through the preferentially permeable channel until it is heated to a temperature at which the mobility of the reservoir oil is significantly increased. The same general procedure for forming the preferentially permeable channel can be used where the reservoir interval is one in which a potentially permeable viscous oil layer overlies a water layer which has a lower oil content and a higher effective permeability to hot or cold aqueous fluids, or where the reservoir interval is one in which a potentially permeable viscous oil layer underlies a gas layer of lower oil content and higher effective permeability.

Thus, applicant discovered that, by first establishing a preferentially permeable channel which is located in or near a potentially permeable oil layer, so that such a channel is or soon becomes substantially free of oil, and then injecting a relatively viscous hot water foam which tends to become increasingly resistant to flowing through the portions of the preferentially permeable channel that contains the least oil, the temperature and composition of the inflowing hot water foam can be adjusted so that it forces a significant portion of hot fluid to flow through increasingly large portions of the potentially permeable channel and causes a significant amount of oil to be produced while the effective permeability of the potentially permeable oil layer is being increased by the heating and removing of the oil it contains. Substantially the only measuring or monitoring that is needed in order to significantly increase the rate and extent at which the oil is recovered is an intermittent or continuous determining of the produced fluid temperature and the magnitude of the injection pressure (and/or pressure gradient) required for maintaining a selected rate of flow through the reservoir interval of a hot aqueous fluid which consists of, or contains a significant proportion of, a relatively viscous hot water foam.

In general, in conducting the present process, the injection pressure required to maintain a selected rate of flow of a hot fluid inclusive of a relatively viscous hot water foam through the reservoir interval should be significantly greater than that required to maintain a similar rate of flow of a relatively non-viscous hot fluid (such as steam) through the reservoir interval (after forming and heating a preferentially permeable channel that extends between the injection and production locations and contains a substantially residual oil saturation with respect to the relatively non-viscous hot fluid) while being less than the reservoir fracturing or overburden-supporting pressure. Numerous procedures are available for adjusting the magnitude of that injection pressure. For example, the injection pressure can be increased by maintaining a substantially constant rate of flow while increasing either the quality or strength of the hot water foam (and thus reducing its mobility) and/or increasing the time for which the foam remains stable by including a viscosity-increasing agent in order to slow down its rate of film drainage. The rate of the heating and producing of the oil within a potentially permeable viscous oil layer located outside the preferentially permeable channel can be increased by increasing the temperature and/or rate of flow of fluid through the reservoir interval. The resistance to the flow of fluid through the reservoir interval can be reduced and/or redistributed by continuously or intermittently (a) including portions of steam in the fluid being flowed through that interval, in order to increase the rate of penetrating and heating within the upper portion of the interval, or (b) similarly including portions of hot water, in order to increase the rate of penetrating and heating within the lower portion of the interval, or (c) by continuously or intermittently reducing either the quality or strength of the hot water foam by lowering its gas content, etc. The foam strength can be increased or decreased by varying the kind or amount of the surfactant and/or electrolyte that it contains, etc.

LABORATORY TESTS

Figure 1:
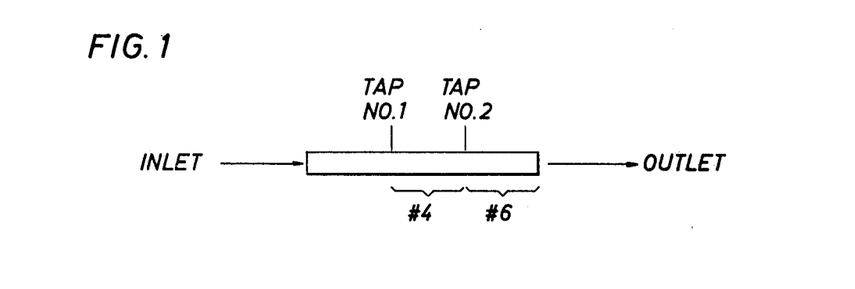
FIG. 1 is a schematic illustration of a sand pack apparatus for simulating a flow of fluid through a permeable earth formation.

Experiments were conducted in a sand pack apparatus of the type shown in FIG. 1 to measure the oil production characteristics of a relatively viscous hot water foam. Sand packs which were about 1 foot long and 1 inch in diameter were horizontally mounted and made up of Ottawa sand to have an average absolute permeability of about 3.5 darcys. The experiments were conducted with the sand packs having a temperature of 180° F. and containing an initial oil saturation of 0.9 of a reservoir crude oil having a viscosity of about 180 centipoises at the temperature of the experiment. Where water was injected, it was distilled water at 180° F., and where foam was injected, its temperature was the same. The foam was prepared as follows: 3.5 standard milliliters per minute of nitrogen was mixed with 1.5 milliliters per minute of a water solution containing 0.25%w Siponate DS-10 sulfonate surfactant and 0.5%w of sodium chloride to form a hot water foam having a quality of 70 percent at standard conditions (i.e., 760 mm Hg and 0° C.). Since the foam "quality" relates to the percent volume of the gas phase component, the quality varies with pressure and temperature, and, in the experiments, the foam quality varied as the foam entered and moved through a sand pack.

Figure 2:
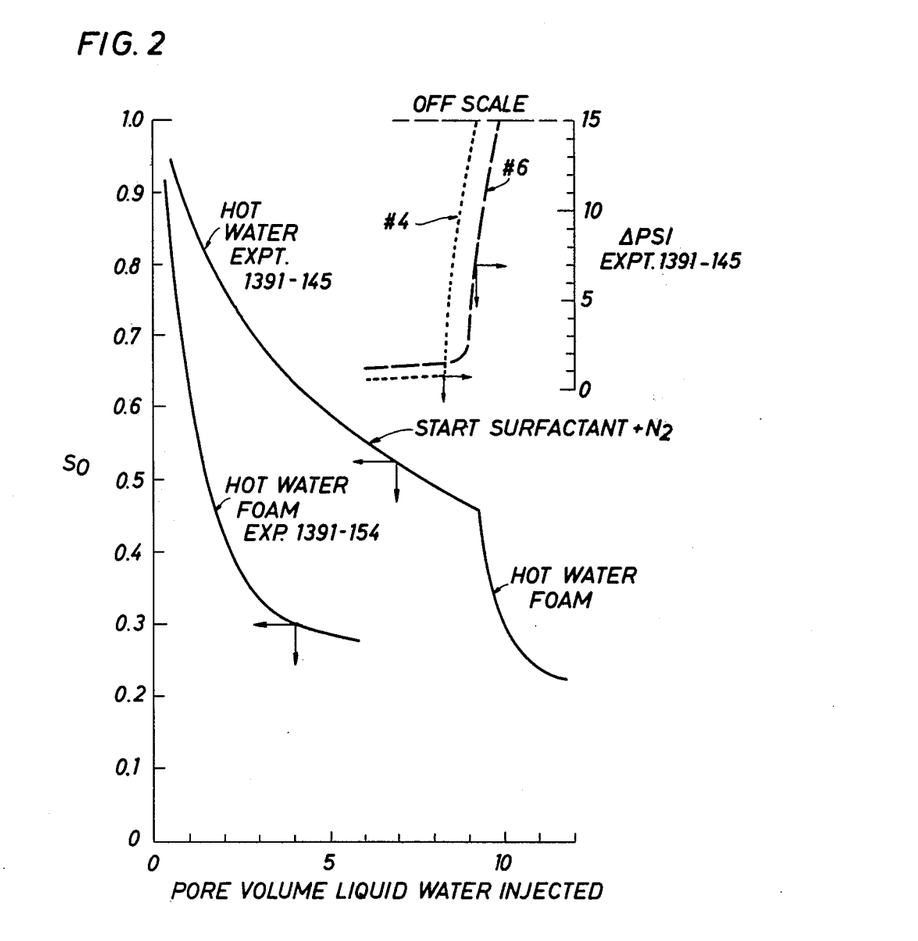
FIG. 2 illustrated plots of the variations in oil saturation and fluid pressure with amount of fluid flowed through a sand pack of the type shown in FIG. 1.

FIG. 2 shows a plot of comparative results of (a) a hot water flood, Experiment 145, in which about 7 pore volumes of hot water were injected prior to converting the hot aqueous fluid being flowed through the sand pack to a hot water foam and (b) a hot water foam flood, Experiment 154, in which only hot water foam was injected. The curves labeled No. 4 and No. 6 in the upper right-hand portion of FIG. 2 show the variations in the pressure, with pore volumes of liquid water injected (in the form of the hot water foam) as the foam moved through the portions marked No. 4 and No. 6 on the sand pack apparatus of FIG. 1.

At the time the hot water foam injection was started in Experiment 145 (after about 7 pore volumes of hot water had been injected) the sand pack was similar to a preferentially permeable channel within a potentially permeable viscous oil layer in which the oil saturation had decreased to near a hot water residual. It is apparent that the inflow of the hot aqueous foam caused a material increase in both the injection pressure required to maintain the flow (kept at a substantially constant rate in each of the experiments) and in the rate and extent of oil production. In the sand pack used in the hot water foam injection, Experiment 154, the original effective permeability to water at 180° F. was 3.3 darcys. By the end of the hot water foam injection the effective permeability to the hot fluid then being injected was only about 0.005 darcys. It is apparent that the rate of oil production by hot water foam was significantly more rapid than that of the hot water flood.

Figure 3:
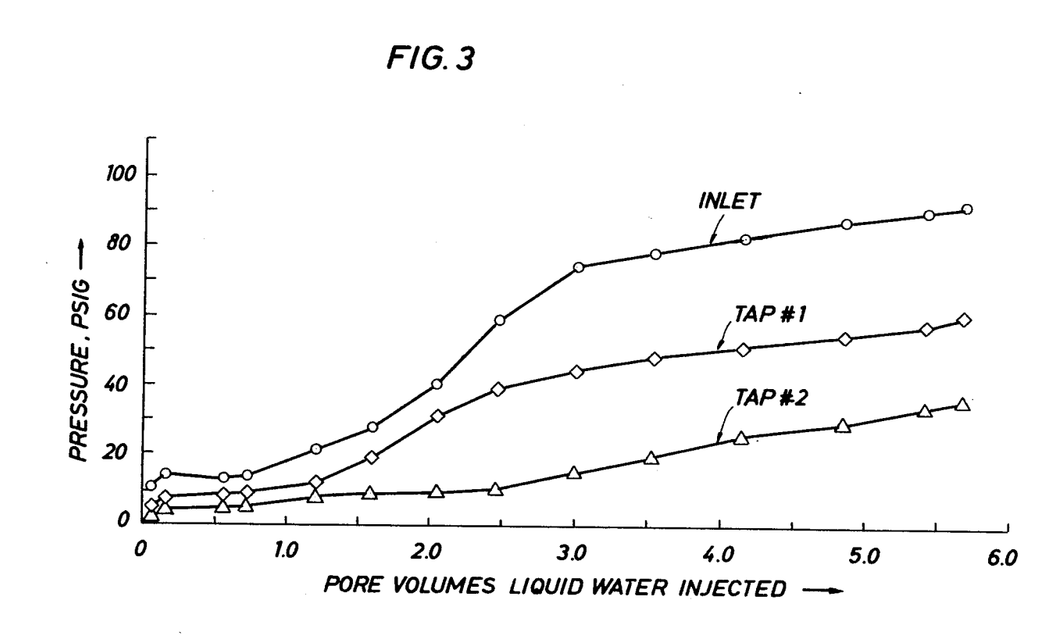
FIG. 3 illustrates plots of the variations in pressure at various points (along a sand pack of the type shown in FIG. 1) with volume of water injected into the sand pack.

FIG. 3 shows the detailed fluid pressure history in the sand pack apparatus during the hot water foam injection, Experiment 154. At the start of this test the sand pack was similar to a potentially permeable viscous oil layer which had been heated to 180° F., for example, by heat conducted from a nearby preferentially permeable channel through which a hot fluid was flowing. The curves labeled "Inlet", "Tap No. 1" and "Tap No. 2" relate to the pressures as measured at the correspondingly labeled portions of the sand pack apparatus shown in FIG. 1. It should be noted that at the end of the hot water foam injection the pressure drop across the sand pack was 90 psi and still rising. This amounts to a significantly higher pressure gradient than that provided by hot water. For example, at the end of the water injection phase of Experiment 145, the pressure drop across that sand pack was only 3 psi.

POSTULATED FIELD BEHAVIOR

Figure 4:
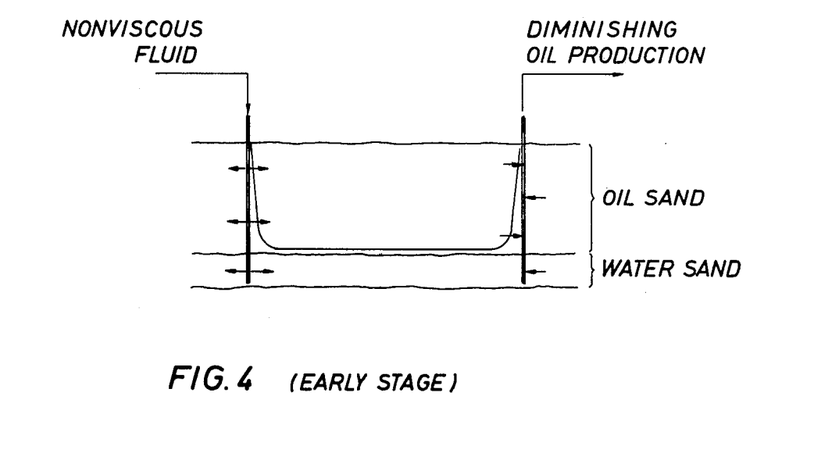
FIGS. 4, 4A, 5 and 5A are schematic illustrations of earlier and later stages of applications of the present invention to subterranean reservoir intervals.
Figure 4A:
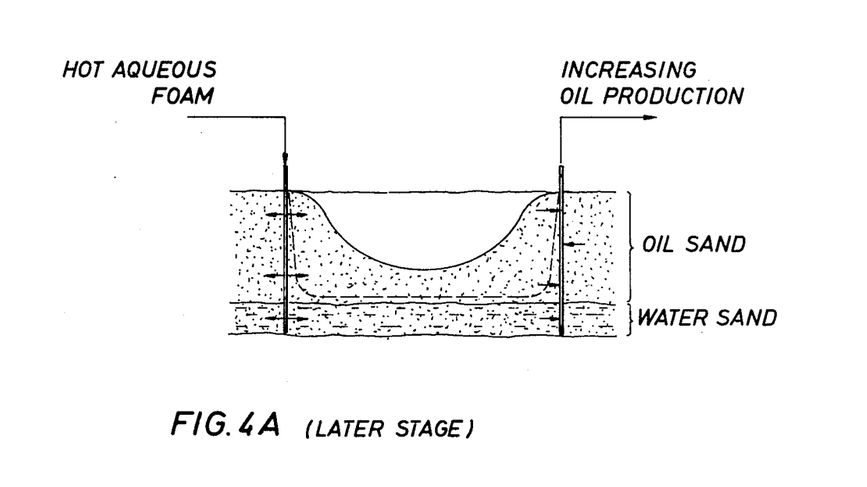

FIGS. 4 and 4A are schematic illustrations of early and late stages of an application of the present invention to a relatively thick and non-stratified viscous oil reservoir: Such an oil sand might have a thickness of around 50 feet and average porosity of about 30-35%, with permeabilities in the 1-10 darcy range and might contain a substantially non-movable oil having a viscosity in the order of 6,000 centipoised at reservoir temperature. As shown in FIG. 4, steam is being injected into the reservoir interval while fluid is being produced at a horizontally spaced location, such as an injection-production well-pair of a 2½ acre 5-spot well pattern. In such a reservoir, steam tends to override the reservoir fluids and form a steam channel through which substantially all of the steam flows in response to a decreasing relatively low pressure gradient that results in a decreasing rate of oil production.

FIG. 4A shows the same reservoir at a later stage at which a hot aqueous foam is being injected into the reservoir. As illustrated, this tends to cause an increasing rate of oil producing and channel expanding, due to a significantly higher pressure gradient being established within the steam channel and a greater proportion of the injected hot fluid being forced into the relatively less permeable portion of the reservoir interval outside the steam channel.

The present invention is particularly suited for use in a reservoir of the type shown in FIG. 4 where substantially all of the reservoir interval is occupied by a potentially permeable viscous oil layer having a significantly high effective permeability to steam. In such reservoirs a preferred operating procedure involves the following. Injection wells are completed into the lower ⅓ of the reservoir interval while production wells are opened into substantially the total interval. A preferentially permeable channel extending between the injection and production wells is formed by injecting steam while producing fluid at relatively high rates. The onset of a steam breakthrough is indicated by increases in the temperature of the produced fluids and decreases in the bottom hole steam injection pressures needed to maintain a selected rate of injection.

At least soon after the onset of the steam breakthrough, it is desirable to convert the hot fluid being injected from steam to a viscous hot water foam. As known to those skilled in the art, the well site facilities needed for this can comprise presently available equipment. For example, the flow lines from the steam generator can be interconnected with supplying and pumping means for delivering liquid or liquefied surfactant, supplying and compressing means for delivering pressurized noncondensable gas, and supplying and pumping means for delivering a pressurized aqueous salt solution and the upstream end of a foam-forming device, such as a static mixer, and mixing chamber connected to a conduit for conveying a relatively viscous hot water foam into the injection tubing string of an injection well. As known to those skilled in the art, with such equipment the temperature and chemical composition of the foam can be varied substantially as desired by adjusting the temperature and relative flow rates of the various interconnected streams.

The conversion of the hot fluid being injected from steam to hot water foam is preferably conducted so that substantially all of the fluid being injected soon consists of a noncondensable gas and hot aqueous liquid foam at a temperature just slightly less than that which would evaporate enough water at the wellhead injection pressure to cause steam to comprise more than about 12% of the gaseous phase of the hot water foam. As the foam enters the reservoir interval the bottom hole injection pressure should be increased as required to maintain a selected rate of injecting aqueous fluid into the reservoir interval (e.g., at a rate equivalent to at least about several hundred barrels per day of water) while ensuring that the bottomhole injection pressure remains significantly below the reservoir fracturing pressure (e.g., not more than about 80% of that pressure). The quality and/or composition of the hot water foam are changed to the extent required to enable such a rate of injection to be obtained in response to a bottomhole injection pressure which is significantly greater than that needed to attain such a rate of flow of steam, but is less than the reservoir fracturing pressure. In general, by means of relatively simple laboratory tests on sand packs or cores of the reservoir the samples of the reservoir oil and brine, the compositions and quality of foam that are needed to attain a suitable rate of injection at a suitable gradient can be relatively accurately predicted before the field operations are started. However, as indicated above, adjustments can be readily made during the field operations. In general, the oil produced by the process can be recovered from the produced fluid by means of techniques and equipment which are currently available.

Figure 5:
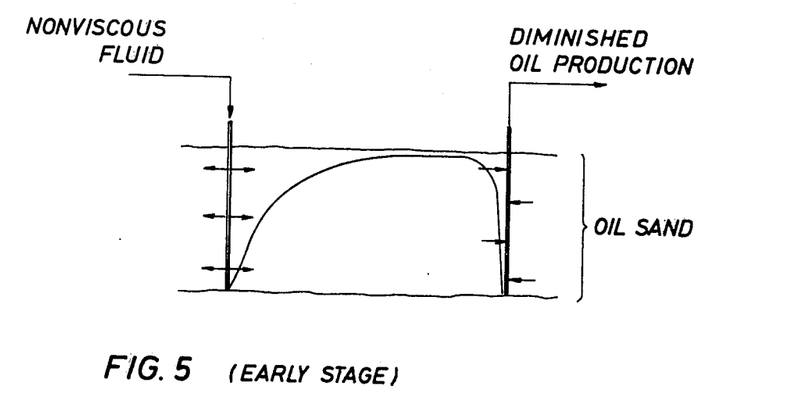
Figure 5A:
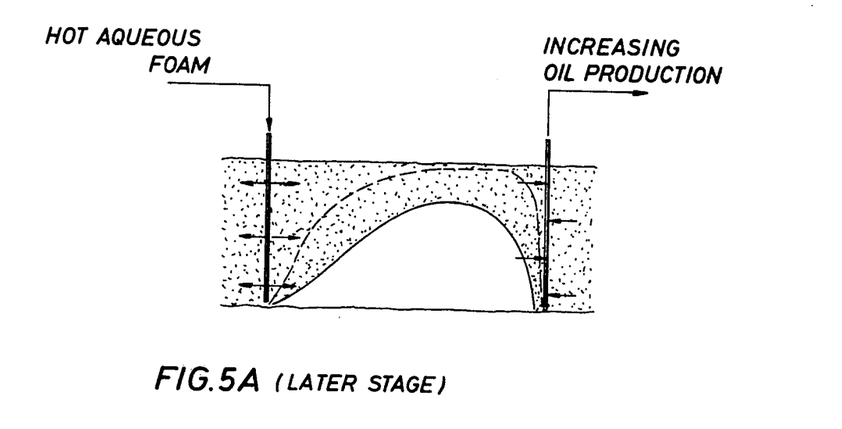

FIGS. 5 and 5A illustrate similar stages of applying the present process to a reservoir interval of a type in which an oil having a viscosity of about 1000 centipoises at reservoir temperature is contained in an upper layer in which the oil saturation is about 60 to 85% and the effective permeability to steam is only about 0.3 darcy, immediately above a water layer in which the oil saturation averages about 35% and the effective permeability to steam is about 1.7 darcys. As indicated in FIG. 5, even when steam is injected into the total reservoir interval, substantially all of the steam channels through the water layer and the oil production rate soon diminishes to an undesirably low rate. FIG. 5A shows that injecting a hot aqueous foam significantly reduces the mobility within the steam channel and forces additional portions of hot fluid into the overlying oil sand. In such a reservoir intermittent injections of steam are advantageous since the overriding tendency of the steam and the increased heating efficiency of it work together to increase the rate of oil production and permeability enhancement in the overlying oil sand.

In general, the present process is applicable to substantially any subterranean reservoir into which well conduits can be opened at horizontally spaced locations within an interval which (a) contains at least one layer in which an oil that is relatively viscous at the reservoir temperature is present in a layer of rocks having an absolute permeability of at least about 0.5 darcy and (b) contains or can be caused to contain a channel of preferential permeability that extends between the injection and production locations and is located in or near the oil-bearing layer. The types of reservoir formations described in the '271 application are suitable, even where their locations are too deep for steam injection to be feasible. In addition, the present invention is applicable to relatively highly stratified reservoir intervals (in which an injected non-viscous fluid such as steam tends to be kept within one or more layers of preferentially high absolute pressure) as long as the preferentially permeable layers are sufficiently close to the oil-bearing layers to provide an economically feasible rate of heat transfer into the oil-bearing layers. Such reservoir intervals can be consolidated or unconsolidated and can contain oils ranging from moderately viscous oils to substantially immobile tars.

CHEMICALS SUITABLE FOR USE IN THE PRESENT PROCESS

Relatively non-viscous fluids suitable for use in forming a preferentially permeable channel in accordance with the present process can comprise substantially any liquid or gas which is initially hot or cold and has a viscosity at least substantially as low as that of an aqueous brine. Examples of such fluids include aqueous liquids, steam, non-viscous gaseous or liquid oil solvents, $CO_2$, flue gas, and the like. If desired, such a relatively non-viscous fluid can be initially injected into the reservoir interval at substantially ambient temperature so that it breaks through into the production location prior to injecting a hot relatively non-viscous fluid. The latter fluid can be the same as or different from the initially injected fluid. Particularly suitable fluids comprise wet or dry steam or a low grade steam (in which the aqueous liquid phase contains dissolved salts).

An aqueous liquid suitable for use in forming a relatively viscous hot water foam in accordance with the present process can comprise water or substantially any aqueous solution of solutes which are compatible with the other components of the foam. Particularly suitable aqueous liquids comprise water or water solutions containing the kinds and amounts of water-soluble salts that enhance the foam-forming and/or oil-displacing activity of the surfactant to be used.

A surfactant used for forming a relatively viscous hot water foam in accordance with the present invention can comprise substantially any anionic, nonionic or cationic surfactant which is stable at the temperature at which the foam is to be injected and, at the same temperature, is capable of forming a relatively stable non-condensable gas-in-aqueous liquid foam, such as a foam which is stable in contact with the reservoir oil for at least the time required for injecting into the reservoir interval a volume of the foam amounting to from about 0.05 to 3 pore volumes of the reservoir interval. The surfactant or surfactant system (i.e., water, surfactant and, optionally, salts, cosurfactants, and the like), is preferably capable of forming a hot water foam which is (a) capable of reducing the fluid mobility within a preferentially permeable channel (such as one extending through a reservoir interval and having an oil saturation which is substantially a residual value relative to the flow of hot water or steam) to less than about 0.2 of that exhibited during the flow of the hot water or steam, and (b) is capable of flowing through that perferentially permeable channel at a selected rate (i.e., equivalent to injecting at least several hundred barrels of water per day) in response to an injection pressure which is significantly less than the fracturing or overburden pressure of the reservoir (e.g., not more than about 80% of such a pressure). Anionic surfactants are particularly suitable. Examples of suitable surfactants include the mixtures of preferentially oil-soluble and preferentially water-soluble alkyl aryl sulfonates described in the J. Reisberg U.S. Pat. No. 3,348,611; aqueous solutions or dispersions of acid soaps in which the soap concentration exceeds the critical concentration for micelle formation, such as solutions of a partially neutralized Acintol-T tall oil pitch available from Arizona Chemical Company, a partially neutralized mixture of petroleum or vegetable acids or the like as described in the J. Reisberg U.S. Pat. No. 3,330,344; one or more cationic surfactant such as acetyl trimethylammoniumbromide, one or more nonionic surfactants, such as Triton X-100 polyalkoxyalcohol surfactant available from Rohm & Haas, synthetic or petroleum sulfonate surfactants which are commercially available, and the like. Particularly suitable surfactants include the alkyl benzene sulfonate surfactants available from American Alcolac Company under the trade name Siponate DS-10, or those available from Continental Oil Company under the trade name Conoco C-550 Slurry.

The noncondensable gas used in forming the relatively viscous hot water foam in accordance with the present invention can comprise substantially any which undergoes little or no condensation at the temperature and pressure at which that foam is injected into or displaced through the reservoir interval and is substantially inert to and compatible with the other components of that foam. Nitrogen is a particularly suitable noncondensable gas but such a gas can also comprise mixtures or individual gases such as air, ethane, methane, flue gas, fuel gas and the like.

In one application of the present process, well conduits are arranged for injecting and producing fluid at horizontally spaced locations within a potentially permeable viscous oil-containing subterranean reservoir interval in which the effective permeability is such that steam or hot water can be flowed through it, in response to a pressure less than the fracturing pressure of the reservoir, so that the hot fluid breaks through into a production location. The flow is continued so that the heating and removing of the oil forms a preferentially permeable channel within the potentially permeable viscous oil-containing layer. In such a situation, the horizontal and/or vertical width of the preferentially permeable channel increases as oil is removed from the periphery of the permeable portion of the channel. The channel is preferably initially widened by injecting and controlling the mobility of a steam foam while producing oil from the channel, in the manner described in the '271 patent application. Subsequently (for example, when the amount of oil produced per unit of steam injected begins to decline or tends to remain at an undesirably low level, or when the cost or difficulty of forming and injecting a steam foam having a mobility low enough to maintain a desirable rate of oil production becomes excessive) the composition of the fluid being injected is changed so that substantially all of it comprises a relatively viscous hot water foam. Such a foam is preferably injected, in accordance with the present process, at a temperature at which its heat is substantially equivalent to that of the steam foam (minus the heat of vaporizing the water that formed the steam phase of the steam foam) in response to a pressure significantly greater than that at which the steam foam was being injected. This increases the rate of oil production by increasing the rate of heating and displacing oil from portions of the reservoir outside the preferentially permeable channel.

What is claimed is:

1. An oil recovery process which comprises:

arranging well conduits for injecting and producing fluid at horizontally separated locations within a subterranean interval which contains at least one oil-bearing layer which, at the reservoir temperature, has an absolute permeability of at least about 0.5 darcy and contains an oil having a viscosity of at least about 100 centipoises, flowing a relatively non-viscous fluid through the reservoir interval and heating at least subsequently inflowed portions of that fluid hot enough to significantly increase the mobility of the reservoir oil, controlling the rates of heating and injecting the relatively non-viscous fluid and the rate of producing fluid from the reservoir interval so that (a) a heated channel of preferential permeability is formed within or near the oil-bearing layer and (b) the pressure gradient required for flowing the heated, relatively non-viscous fluid through the preferentially permeable channel is reduced or kept low by the thermal mobilization of any reservoir fluid encountered within that channel, changing the composition of the fluid being flowed through the reservoir interval by including as at least a mobility-controlling proportion of that fluid a relatively viscous hot water foam that consists essentially of aqueous liquid, noncondensable gas and surfactant and is hot enough to significantly increase the mobility of the reservoir oil, controlling the composition of the hot water foam being injected so that, in contact with the reservoir rocks and fluids within the reservoir, the foam has a mobility low enough so that flowing it through the heated, preferentially permeable channel requires a pressure gradient exceeding that required to cause an equivalent rate of flow of the heated relatively non-viscous fluid through that channel without requiring an injection pressure that exceeds the fracturing pressure of the reservoir, and recovering oil from fluid produced from the reservoir interval while adjusting the composition and temperature of the total amount of fluid being flowed through the reservoir interval so that the produced fluid contains heated oil and a significant portion of fluid flows through portions of the reservoir interval other than those within the channel of preferential permeability.

2. The process of claim 1 in which at least the subsequently inflowed portions of the relatively non-viscous fluid which is flowed through the reservoir consists essentially of steam.

3. The process of claim 2 in which the composition of the fluid being flowed through the reservoir interval is changed from steam to steam foam prior to the inclusion of the relatively viscous hot water foam.

4. The process of claim 3 in which the fluid injection pressure is monitored and the composition of the fluid being flowed through the reservoir interval is adjusted by including enough steam or hot water to reduce the injection pressure required to maintain a selected rate of flow.

5. The process of claim 1 in which the reservoir interval to be treated consists essentially of a relatively thick oil-bearing formation having a relatively non-stratified absolute permeability.

6. The process of claim 1 in which the reservoir interval consists essentially of an oil-bearing layer overlying a layer having a greater water saturation and greater effective permeability to hot water or steam.

7. The process of claim 1 in which the reservoir interval consists essentially of an oil-bearing layer underlying a layer of higher gas content and higher effective permeability to hot water or steam.

8. The process of claim 1 in which the surfactant used in forming the relatively viscous hot water foam is a Siponate DS-10 sulfonate surfactant.

9. The process of claim 1 in which the surfactant used in forming the relatively viscous hot water foam is capable of forming an active aqueous petroleum sulfonate surfactant system.

10. In an oil recovery process in which steam or hot water is flowed through a reservoir in which a permeable channel extends between horizontally separated injection and production locations and extends through or along an oil-bearing layer in which the absolute permeability is relatively high but the effective permeability is relatively low due to a relatively high viscosity of the oil at the reservoir temperature, the improvement which comprises:

converting at least a significant portion of the so flowed hot aqueous fluid from steam or hot water to a hot water foam which consists essentially of aqueous liquid, noncondensable gas, and surfactant, and is hot enough to significantly increase the mobility of the reservoir oil;

adjusting the composition of said hot water foam in relation to the physical and chemical properties of the fluid and rocks within the reservoir so that within said preferentially permeable channel the mobility of the foam is significantly less than that exhibited by steam or hot water but is high enough so that the foam is capable of flowing through that channel at a rate providing a flow of at least several hundred barrels per day of water equivalent in response to an injection pressure insufficient to fracture or support the overburden above the reservoir interval; and recovering oil from fluid produced from the reservoir interval while adjusting the composition and temperature of the total amount of fluid flowed through that interval so that the produced fluid contains heated oil and a significant portion of the total amount of fluid flows through portions of the reservoir interval other than those within the preferentially permeable channel.

11. The process of claim 10 in which the fluid injection pressure is monitored and the composition of the inflowing fluid is adjusted by including enough steam or hot water to reduce the injection pressure required to maintain a selected rate of flow.

12. The process of claim 10 in which the fluid injection pressure is monitored and the composition of the fluid being flowed through the reservoir interval is adjusted by increasing the quality of the relatively viscous hot water foam enough to increase the injection pressure required to maintain a selected rate of flow.

13. The process of claim 10 in which the reservoir interval to be treated consists essentially of a relatively thick oil-bearing formation having a relatively non-stratified absolute permeability.

14. The process of claim 10 in which the reservoir interval consists essentially of an oil-bearing layer overlying a layer having a greater water saturation and a greater effective permeability to hot water or steam.

15. The process of claim 10 in which the reservoir interval consists essentially of an oil-bearing layer underlying a layer of higher gas content and higher effective permeability to hot water or steam.

16. An oil recovery process which comprises:

arranging well conduits for injecting and producing fluid at horizontally separated locations within a subterranean interval which contains at least one oil-bearing layer in which, at the reservoir temperature, the oil has a relatively high viscosity and is contained within a rock layer of relatively high absolute permeability;

flowing a relatively non-viscous fluid through the reservoir interval and heating at least subsequently inflowed portions of that fluid hot enough to significantly increase the mobility of the reservoir oil;

controlling the rates of heating and injecting the relatively non-viscous fluid and the rate of producing fluid from the reservoir interval so that (a) a heated channel of preferential permeability is formed within or near the oil-bearing layer and (b) the pressure gradient required for flowing the heated, relatively non-viscous fluid through the preferentially permeable channel is reduced or kept low by the thermal mobilization of any reservoir fluid encountered within that channel, changing the composition of the fluid being flowed through the reservoir interval by including as at least a mobility-controlling proportion of that fluid a relatively viscous hot water foam that consists essentially of aqueous liquid, noncondensable gas and surfactant and is hot enough to significantly increase the mobility of the reservoir oil;

controlling the composition of the hot water foam being injected so that, in contact with the reservoir rocks and fluids within the reservoir, the foam has a mobility low enough so that flowing it through the heated, preferentially permeable channel requires a pressure gradient exceeding that required to cause an equivalent rate of flow of the heated relatively non-viscous fluid through the channel without requiring an injection pressure that exceeds the fracturing pressure of the reservior; and, recovering oil from fluid produced from the reservoir interval while adjusting the composition and temperature of the total amount of fluid being flowed through the reservoir interval so that the produced fluid contains heated oil and a significant portion of fluid flows through portions of the reservoir interval other than those within the channel of preferential permeability.

* * * * *